United States Patent
Saito et al.

(10) Patent No.: US 8,358,364 B2
(45) Date of Patent: Jan. 22, 2013

(54) ELECTRONIC APPARATUS AND COMMUNICATION SYSTEM

(75) Inventors: Keiji Saito, Ome (JP); Takeshi Ishihara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/117,043

(22) Filed: May 26, 2011

(65) Prior Publication Data

US 2011/0295439 A1    Dec. 1, 2011

(30) Foreign Application Priority Data

May 31, 2010 (JP) ................................. 2010-125367

(51) Int. Cl.
- *H04N 5/222* (2006.01)
- *H04N 5/445* (2011.01)
- *G06F 1/00* (2006.01)
- *G06F 1/26* (2006.01)
- *G08C 19/12* (2006.01)
- *G05D 11/00* (2006.01)

(52) U.S. Cl. ................... 348/333.13; 348/564; 713/300; 713/310; 713/320; 341/173; 700/296

(58) Field of Classification Search ............ 348/333.13, 348/564; 713/300, 310, 320; 341/173; 700/295
See application file for complete search history.

(56) References Cited

U.S. PATENT DOCUMENTS

| | | | |
|---|---|---|---|
| 7,593,979 B2 | 9/2009 | Seki et al. | |
| 2004/0060066 A1 | 3/2004 | Seki et al. | |
| 2004/0207537 A1* | 10/2004 | Keller et al. | 340/825.72 |
| 2005/0094667 A1* | 5/2005 | Dahlman et al. | 370/473 |
| 2008/0291324 A1* | 11/2008 | Hong et al. | 348/484 |
| 2009/0054003 A1* | 2/2009 | Lee | 455/68 |
| 2010/0033026 A1 | 2/2010 | Goto et al. | |
| 2010/0050214 A1* | 2/2010 | Funabiki et al. | 725/81 |
| 2010/0057904 A1 | 3/2010 | Nagamori | |
| 2010/0115318 A1* | 5/2010 | Suzuki et al. | 713/323 |
| 2010/0131782 A1* | 5/2010 | Higuchi | 713/310 |
| 2010/0299517 A1* | 11/2010 | Jukic et al. | 713/150 |
| 2011/0156944 A1* | 6/2011 | Ward et al. | 341/176 |
| 2012/0023240 A1* | 1/2012 | Kwon et al. | 709/227 |
| 2012/0105725 A1* | 5/2012 | Tanaka et al. | 348/569 |

FOREIGN PATENT DOCUMENTS

| | | |
|---|---|---|
| JP | 2000-152349 A | 5/2000 |
| JP | 2004-032546 | 1/2004 |
| JP | 2007-102574 | 4/2007 |
| JP | 2007-258984 A | 10/2007 |
| JP | 2009-088651 | 4/2009 |
| JP | 2010-045450 A | 2/2010 |
| JP | 2010-061459 A | 3/2010 |
| WO | WO 2008/108070 A1 | 9/2008 |

\* cited by examiner

*Primary Examiner* — John R. Cottingham
*Assistant Examiner* — Darrin Dunn
(74) *Attorney, Agent, or Firm* — Knobbe, Martens, Olson & Bear, LLP

(57) ABSTRACT

According to one embodiment, an electronic apparatus includes one or more first receivers, a transmitter and a change module. The first receivers are configured to receive a command signal which instructs change of a power control state from another electronic apparatus. The transmitter is configured to transmit, to the another electronic apparatus, standby-capability information that includes a communication method adopted by the first receivers and a signal form specifying the command signal. The change module is configured to change the power control state when the first receivers receive the command signal.

11 Claims, 6 Drawing Sheets

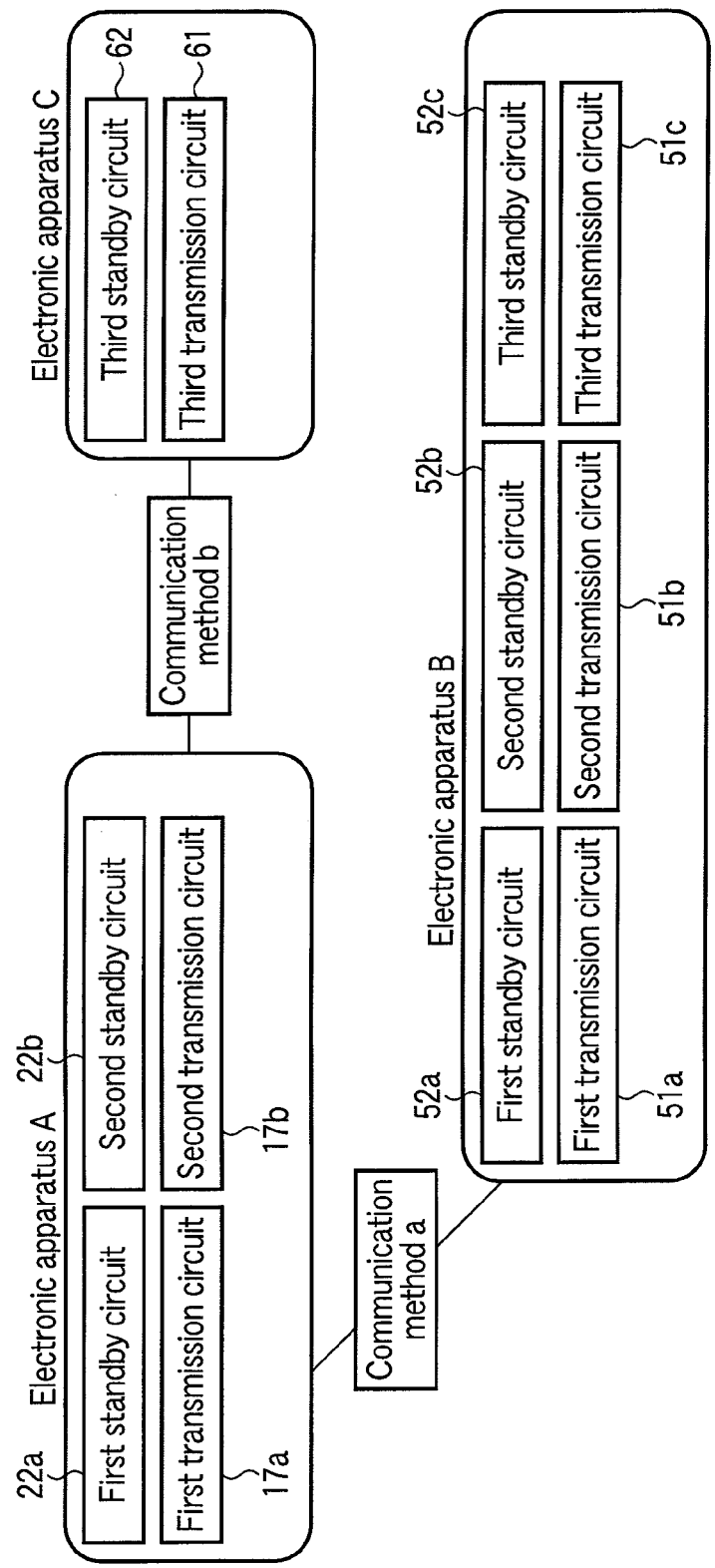
F I G. 2

Communication method : Bluetooth
Signal : Page packet
ID : 0x001122...
Time required for startup : 5 seconds
Standby power consumption : 150 μW Communication method : RF900MHz
Signal : ASK
ID : 0x001122...
Time required for startup : 5 seconds
Standby power consumption : 100 μW

⋮

F I G. 3

Communication method : Bluetooth
Signal : Page packet

Communication method : RF900MHz
Signal : ASK

⋮

F I G. 4

Signal waited : {
Communication method: Bluetooth
Signal : Page packet
ID : 0x001122...
 Time required for startup : 5 seconds
 Next startup time : 21 : 45
 Standby power consumption : 10 μW

⋮

F I G. 5

| Electronic apparatus B | Electronic apparatus C |
|---|---|
| Communication method : Bluetooth<br>Signal : Page packet | Communication method : WiFi<br>Signal : Beacon |
| Communication method : RF900MHz<br>Signal : ASK | |
| Communication method : WiFi<br>Signal : Beacon | |

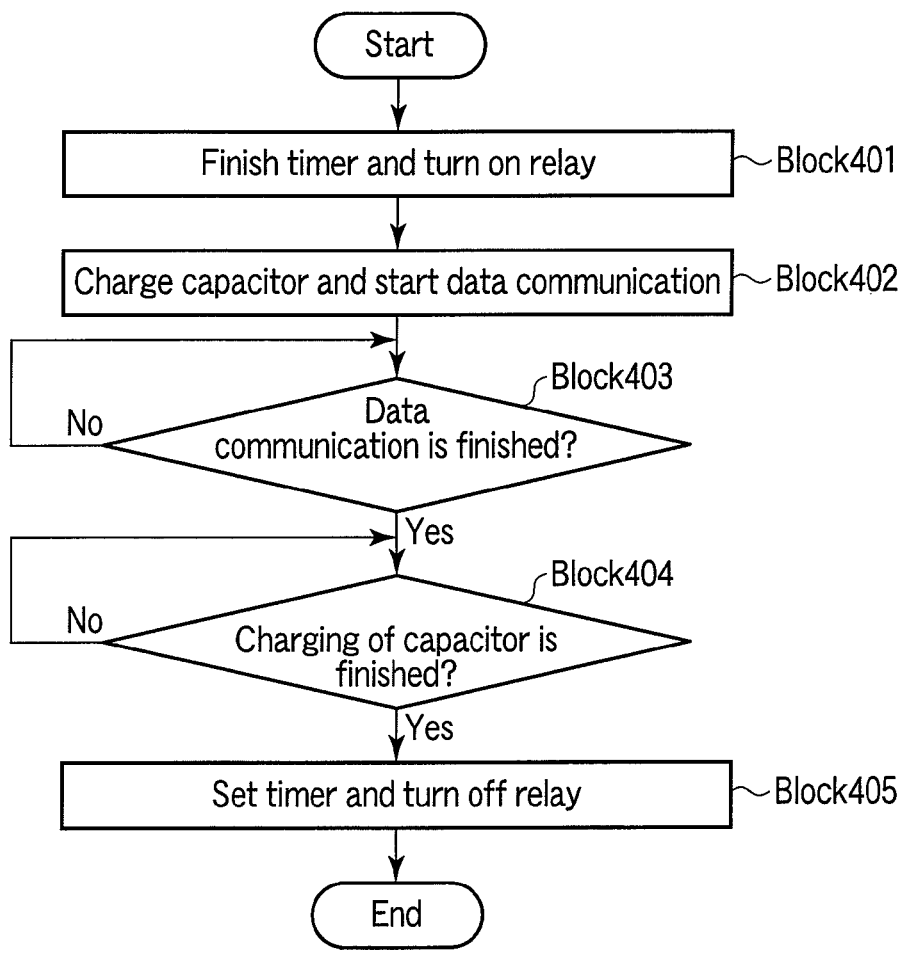
F I G. 10

ELECTRONIC APPARATUS AND COMMUNICATION SYSTEM

CROSS-REFERENCE TO RELATED APPLICATIONS

This application is based upon and claims the benefit of priority from Japanese Patent Application No. 2010-125367, filed May 31, 2010, the entire contents of which are incorporated herein by reference.

FIELD

Embodiments described herein relate generally to an electronic apparatus and a communication system, which switch operation states.

BACKGROUND

In recent years, electronic apparatuses such as television broadcasting receivers are sometimes equipped with a low-power consumption circuit module, which includes a standby circuit that waits for only a start signal, to reduce the electric power consumed in stand-by state. Such electronic apparatuses include home electrical appliance such as HDD/DVD recorders, DVD players, personal computers, air conditioners, radio routers, set-top boxes, and home gateways. The standby circuit receives a start signal transmitted from a remote controller or another electronic apparatus. Such electronic apparatuses start power supply to the whole electronic apparatuses (specifically, to a main circuit and a communication circuit thereof), when the electronic apparatuses receive a start signal. Specifically, the standby circuit is driven by a weak electric current supplied from a power source provided in the low-power consumption circuit module.

Such electronic apparatuses have a low-power consumption standby mode in which no circuits other than the low-power consumption circuit module operate. The electronic apparatus changes from the low-power consumption standby mode to an operation mode such as a normal operation mode and a standby mode, by starting power supply to the circuits other than the low-power consumption circuit module when the electronic apparatus receives a start signal. In addition, in the low-power consumption standby mode, the electronic apparatus can control to stop power supply to the circuits other than the low-power consumption circuit module which is driven by a weak electric current. Therefore, the electric apparatus can widely reduce the standby power consumption in the low-power consumption standby mode.

There are cases where such electronic apparatuses achieve a remote operation function of turning on the power of another electronic apparatus through a communication interface. To always achieve such a remote operation function, the electronic apparatus is required to supply electric power to the communication circuit even in the standby state. When the electronic apparatus supplies electric power to the communication circuit, the standby power consumption increases. However, when the electronic apparatus stops power supply to the communication circuit, the electronic apparatus cannot achieve a remote operation function although it can reduce the standby power consumption.

Therefore, the electronic apparatus in the low-power consumption standby mode cannot perform, for example, obtaining EPG data from broadcasting waves, obtaining an update program for the apparatus itself, or making a response to a control command/signal transmitted from another apparatus through a communication channel such as HDMI (Registered Trademark), wired LAN/wireless LAN, ZigBee, and Bluetooth (Registered Trademark). For example, it is impossible to achieve functions such as Power-on from an SRC apparatus to an SNK apparatus by an HDMI-CEC command, and Wake on LAN through a wired LAN/wireless LAN, in a state where no power is supplied to the communication circuit.

For example, by using an HDMI-CEC command, a DVD player can be controlled to turn on the power of a television broadcasting receiver, switch the image input to HDMI, and play back the content of the disk, only by inserting the disk into the DVD player. However, when the television broadcasting receiver stops power supply to the HDMI circuit, it is necessary for the user to turn on the power of the television broadcasting receiver in advance by a remote controller.

In addition, electronic apparatuses which are used at home adopt various communication systems. Such electronic apparatuses adopting different communication systems require complicated connections and complicated network configuration, and it is difficult to apply reduction in standby power consumption achieved by one-to-one combination by a predetermined method to all the electronic apparatuses.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram of a structure of a communication system according to the first embodiment.

FIG. 3 is an exemplary diagram illustrating standby-capability information according to the first embodiment.

FIG. 4 is an exemplary diagram illustrating transmission-capability information according to the first embodiment.

FIG. 5 is an exemplary diagram illustrating notification information according to the first embodiment.

FIG. 10 is an exemplary flowchart for illustrating charging of the power source performed when the timer is finished according to the eighth embodiment.

DETAILED DESCRIPTION

Various embodiments will be described hereinafter with reference to the accompanying drawings.

In general, according to one embodiment, an electronic apparatus includes one or more first receivers, a transmitter and a change module. The first receivers are configured to receive a command signal which instructs change of a power control state from another electronic apparatus. The transmitter is configured to transmit, to the other electronic apparatus, standby-capability information that includes a communication method adopted by the first receivers and a signal form specifying the command signal. The change module is configured to change the power control state when the first receivers receive the command signal.

First Embodiment

Figure 1:
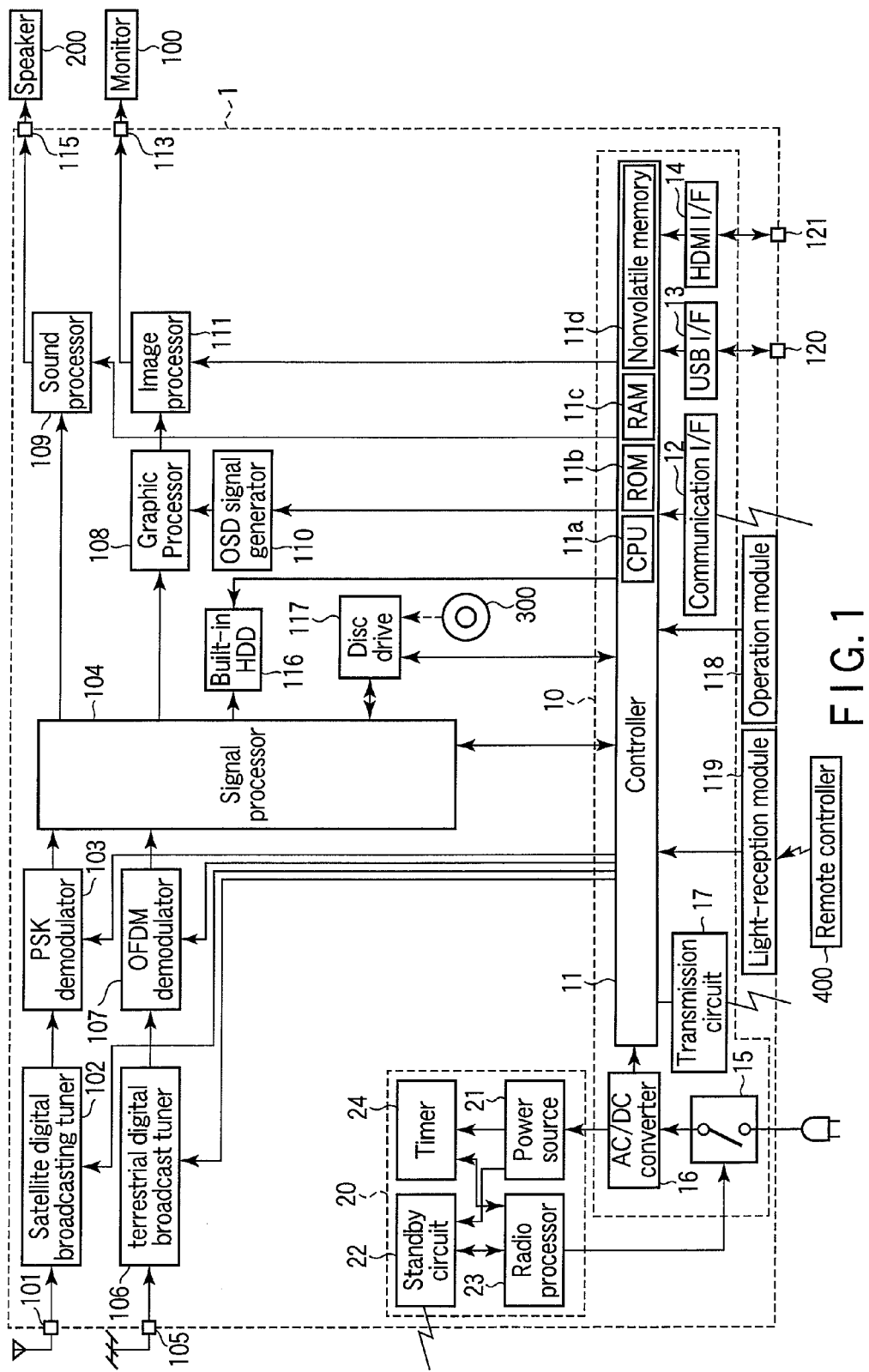
FIG. 1 is an exemplary block diagram of a configuration of an image recording and playback apparatus according to a first embodiment.

A first embodiment will be described hereinafter with reference to drawings. FIG. 1 is a block diagram illustrating a schematic structure of an image recording and playback apparatus 1 according to the first embodiment. Specifically, a satellite digital television broadcasting signal received by a BS/CS digital broadcasting receiving antenna is supplied to a satellite digital broadcasting tuner 102 through an input terminal 101. The satellite digital broadcasting tuner 102 selects a broadcasting signal of a desired channel.

Then, the broadcasting signal selected by the satellite digital broadcasting tuner 102 is supplied to a PSK (phase shift keying) demodulator 103, demodulated into a digital image signal and sound signal, and then outputted to a signal processor 104.

In addition, a terrestrial digital broadcasting signal received by a terrestrial digital broadcasting receiving antenna is supplied to a terrestrial digital broadcasting tuner 106 through an input terminal 105. The terrestrial digital broadcasting tuner 106 selects a broadcasting signal of a channel desired by the user. The broadcasting signal selected by the terrestrial digital broadcasting tuner 106 is supplied to an OFDM (orthogonal frequency division multiplexing) demodulator 107, demodulated into a digital image signal and sound signal, and hen outputted to the signal processor 104.

The signal processor 104 selectively performs predetermined digital signal processing for the digital image signals and digital sound signals supplied from the PSK demodulator 103 and the OFDM demodulator 107, and outputs the signals to a graphic processor 108 and a sound processor 109. The graphic processor 108 has a function of overlaying an OSD signal generated by an OSD (on screen display) signal generator 110 on the digital image signal supplied from the signal processor 104, and outputting the signal. The graphic processor 108 can selectively output the output image signal of the signal processor 104 and the output OSD signal of the OSD signal generator 110, and combine the output signals such that each signal form half of the screen picture and output the combined signal.

The digital image signal outputted from the graphic processor 108 is supplied to an image processor 111. The image signal processed by the image processor 111 is supplied to an output terminal 113. The image signal supplied to the output terminal 113 is input to a monitor 100 connected to the image recording and playback apparatus 1.

The sound processor 109 converts the input digital sound signal into an analog sound signal of a form which can be played back by speakers 200, and supplies the signal to an output terminal 115. The image signal supplied to the output terminal 115 is inputted to the speakers 200 connected to the image recording and playback apparatus 1.

The signal processor 104 is connected with a built-in HDD (hard disk drive) 116. The built-in HDD 116 stores content of the broadcasting signal selected by the terrestrial digital broadcasting tuner 106. In addition, the signal processor 104 is connected with a disc drive 205. The disc drive 205 rotates and drives an optical disc 300, and performs reading and writing of information. The optical disc 300 is, for example, a DVD (Digital Versatile Disc).

Besides, the image recording and playback apparatus 1 includes an electronic apparatus main circuit module 10, and a low-power consumption circuit module 20. The electronic apparatus main circuit module 10 includes a controller 11, a communication I/F 12, a USB (universal serial bus) I/F 13, an HDMI (High Definition Multimedia Interface) I/F 14, a relay circuit 15, an AC/DC converter 16, and a transmission circuit 17. The electronic apparatus main circuit module 10 may include the satellite digital tuner 102, and the terrestrial digital broadcasting tuner 106.

The controller 11 controls all the operations in the image recording and playback apparatus 1, including various receiving operations. The controller 11 includes a CPU (central processing unit) 11a and the like. The controller 11 receives operation information from an operation module 118, or operation information transmitted from a remote controller 400 and received through a light-reception module 119, and controls the modules to reflect the operation information.

The controller 11 mainly uses a ROM (read only memory) 11b which stores a control program executed by the CPU 11a, a RAM (random access memory) 11c which provides the CPU 11a with a work area, and a nonvolatile memory 11d which stores various setting information and control information. The communication I/F 12 is connected to the controller 11. The CPU 11a performs wireless or wired communication through the communication I/F 12, and thereby transmits or receives information to or from external apparatuses. The communication I/F 12 functions as a signal transmitter. Although FIG. 1 illustrates only one communication I/F 12, the image recording and playback apparatus 1 may include a plurality of communication I/F. The CPU 11a is connected to a USB terminal 120 through the USB I/F 13. Thereby, the CPU 11a performs information transmission with an external apparatus connected to the USB terminal 120 through the USB I/F 13. In addition, the CPU 11a is connected to an HDMI terminal 121 through the HDMI I/F 14. Thereby, the CPU 11a performs information transmission with the external apparatus connected to the HDMI terminal 121 through the HDMI I/F 14.

The relay circuit 15 includes a relay which can physically shut off a power supply line from a home wall socket to the image recording and playback apparatus 1. The relay circuit 15 switches the relay, by user's pressing down of the switch provided in the relay circuit 15, control by the CPU 11a, or control by a radio processor 23 described later, and switches start/stop of power supply. The AC/DC converter 16 converts an alternating current supplied from the home wall socket into a direct current. The AC/DC converter 16 supplies electric power to modules of the electronic apparatus main circuit module 10 and a power source 21, which is described later, of the low-power consumption circuit module 20. The transmission module 17 transmits a start signal (a command signal which commands change of the electric power control state), which is a wired signal/wireless signal of a specific pattern to start another electronic apparatus in a low-power consumption standby mode, as described later. Although FIG. 1 illustrates only one transmission circuit 17, the image recording and playback apparatus 1 may includes a plurality of transmission circuits.

The low-power consumption circuit module 20 includes a power source 21, a standby circuit 22, a radio processor 23, and a timer 24. The low-power consumption circuit module 20 controls start/stop of power supply to the electronic apparatus main circuit module 10 through the relay circuit 15, through a start signal from another electronic apparatus. Specifically, the low-power consumption circuit module 20 changes the image recording and playback apparatus 1 from the low-power consumption standby mode described later to a normal operation mode or a standby mode. The power source 21 stores electric power. When the image recording and playback apparatus 1 is in a low-power consumption standby mode, the power source 21 supplies electric power to the modules of the low-power consumption circuit module 20. The power source 21 is charged with electric power supplied from the electronic apparatus main circuit module 10.

The standby circuit 22 receives a radio signal from another electronic apparatus. Although FIG. 1 illustrates only one standby circuit 22, the image recording and playback apparatus 1 may include a plurality of standby circuits. The radio processor 23 processes a signal transmitted from the standby circuit 22. The radio processor 23 determines whether the signal received by the standby circuit 22 is a start signal for the image recording and playback apparatus 1. When the signal received by the standby circuit 22 is a start signal, the radio processor 23 controls the relay circuit 15 of the electronic apparatus main circuit module 10, and performs control to start power supply from the wall socket to the electronic apparatus main circuit module 10. The radio processor 23 functions as an electric power control state changing module. Specifically, when the radio processor 23 receives a start signal, the radio processor 23 changes the electric power control state from the low-power consumption standby mode (a state of performing first power consumption) to the normal operation mode or the standby mode (a state of performing second power consumption larger than the first power consumption). The timer 24 counts the time. The timer 24 controls the relay circuit 15 of the electronic apparatus main circuit module 10 at specific time or designated time (the timer finishing time), such as several hours later from the present time, and starts power supply from the wall socket to the electronic apparatus main circuit module 10. In addition, the radio processor 23 controls turning on/off of operation of the standby circuit 22.

Next, the operation modes in the image recording and playback apparatus 1 will be described hereinafter. The image recording and playback apparatus 1 has the low-power consumption standby mode and other operation modes (for example, the normal operation mode and the standby mode). The low-power consumption standby mode is an operation mode in which the electronic apparatus main circuit module 10 does not operate, although the low-power consumption circuit module 20 operates, since the relay circuit 15 stops power supply to the image recording and playback apparatus 1. Specifically, the image recording and playback apparatus 1 cannot communicate with any external apparatuses through the communication I/F 12. Therefore, in the low-power consumption mode, the image recording and playback apparatus 1 is not supplied with electric power through the relay circuit 15, and thus power consumption thereof can be widely reduced.

In comparison with this, the operation modes other than the low-power consumption standby mode are operation modes in which the low-power consumption circuit module 20 and the electronic apparatus main circuit module 10 operate, since the relay circuit 15 supplies electric power to the image recording and playback apparatus 1. Therefore, in operation modes other than the low-power consumption standby mode, the power consumption of the image recording and playback apparatus 1 increases in comparison with that in the low-power consumption standby mode. In addition, in the standby mode, the image recording and playback apparatus 1 does not need power supply from the exterior.

The following is an explanation of a communication system obtained by connecting a plurality of electronic apparatuses, which have the same function as that of the image recording and playback apparatus 1, by various communication methods. The first embodiment has a structure in which an electronic apparatus transmits a start signal to another electronic apparatus, and thereby the latter electronic apparatus which is in the low-power consumption standby mode is changed to the normal operation mode or the standby mode.

FIG. 2 is a diagram schematically illustrating a communication system between a plurality of electronic apparatuses. Electronic apparatus A schematically illustrates the image recording and playback apparatus 1 illustrated in FIG. 1. Electronic apparatus B and electronic apparatus C are apparatuses which have the same structure as the electronic apparatus main circuit module 10 and the low-power consumption circuit module 20 of the image recording and playback apparatus 1. In FIG. 2, to simplify the explanation, electronic apparatus A, electronic apparatus B, and electronic apparatus C are illustrated with only respective transmission circuits and standby circuits thereof. The first embodiment is applicable to a communication system including at least two electronic apparatuses. Although FIG. 2 illustrates a communication system including three electronic apparatuses, the number of electronic apparatuses is not specifically limited. The electronic apparatuses are not specifically limited, but may be various household appliances such as television broadcasting receivers, HDD recorders, personal computers, radio routers, home gateways, set-top boxes for cable TV, and air conditioners and refrigerators.

The electronic apparatus A includes a first transmission circuit 17*a*, a second transmission circuit 17*b*, a first standby circuit 22*a*, and a second standby circuit 33*b*. The first transmission circuit 17*a* and the second transmission circuit 17*b* have the same structure as that of the transmission circuit 17. The first standby circuit 22*a* and the second standby circuit 22*b* have the same structure as the standby circuit 22.

The electronic apparatus B includes a first transmission circuit 51*a*, a second transmission circuit 51*b*, a third transmission circuit 51*c*, a first standby circuit 52*a*, a second standby circuit 52*b*, and a third standby circuit 52*c*. The first transmission circuit 51*a*, the second transmission circuit 51*b*, and the third transmission circuit 51*c* have the same structure as that of the transmission circuit 17. The first standby circuit 52*a*, the second standby circuit 52*b*, and the third standby circuit 52*c* have the same structure as the standby circuit 22.

The electronic apparatus C includes a third transmission circuit 61, and a third standby circuit 62. The third transmission circuit 61 has the same structure as that of the transmission circuit 17. The third standby circuit 62 has the same structure as the standby circuit 22.

In the communication system, the first standby circuit receives a start signal transmitted from the first transmission circuit of another electronic apparatus. In the same manner, the second standby circuit receives a start signal transmitted from the second transmission circuit of another electronic apparatus. The third standby circuit receives a start signal transmitted from the third transmission circuit of another electronic apparatus. In other words, the first standby circuit does not receive a start signal transmitted from transmission circuits other than the first transmission circuit. The same is applicable to the second standby circuit and the third standby circuit. The first transmission circuit, the second transmission circuit, and the third transmission circuit function as transmitters of a start signal. The first standby circuit, the second standby circuit, and the third standby circuit function as receivers of a start signal.

In addition, the electronic apparatus A and the electronic apparatus B communicate with each other by a communication method a. The electronic apparatus A and the electronic apparatus C communicate with each other by a communication method b which is different from the communication method a. The communication method a and the communication method b are one of, for example, HDMI-CEC, Ethernet (Registered Trademark) (IEEE 802.3), wireless LAN (IEEE 802.11), Bluetooth (IEEE 802.15.1), and ZigBee (IEEE 802.15), but are not limited to them. The electronic apparatus A, the electronic apparatus B, and the electronic apparatus C can communicate with each other in the normal operation mode or the standby mode by the respective communication methods.

The following is an explanation of communication channels between electronic apparatuses. The communication channels include the following types. The type of connecting electronic apparatuses by single-to-single correspondence is, for example, HDMI. The type of connecting electronic apparatuses by single-to-multiple correspondence is, for example, USB and IEEE 1394. The type of connecting electronic apparatuses by multiple-to-multiple correspondence is, for example, wired LAN, wireless LAN, Bluetooth, and ZigBee. Each electronic apparatus includes at least an interactive communication module.

Next, explained is a method of transmitting various information items between electronic apparatuses. The term "various information items" indicates information including at least capability information. The capability information will be described later. In the communication method of the single-to-single connection type, various information items can be directly transmitted without address information or the like. The timing of transmitting various information items depends on the communication method between the electronic apparatuses. When the communication channel is HDMI, the electronic apparatuses may exchange various information items at the phase of establishing a communication channel. In addition, the electronic apparatuses may individually start exchange of various information items after a series of establishing process is finished. The electronic apparatuses may start exchange of various information items before and after start of actual communication.

In communication methods of types of connecting electronic apparatuses by single-to-multiple or multiple-to-multiple correspondence, there are a plurality of methods of transmitting various information items. The first transmission method is a method of transmitting and receiving various information items when the electronic apparatus detects an electronic apparatus being the other party. For example, the electronic apparatus transmits various information items by a multicast/broadcast search request and a unicast response. In this case, the electronic apparatus receives a search request for an apparatus which can announce various information items, and notifies the apparatus of various information items in response to the request. In addition, the electronic apparatus transmits various information items, by announcement of existence information by multicasting and broadcasting and reception of the information. In this case, the electronic apparatus sends a message that it can announce various information items, and notifies another electronic apparatus of various information items when it receives a request. In addition, the electronic apparatus transmits information by announcement of detailed information by multicasting/broadcasting. In this case, the electronic apparatus always notifies another electronic apparatus of various information items.

The second transmission method is a method of transmitting various information items when the electronic apparatus starts communication with an electronic apparatus being the other party. For example, the electronic apparatus transmits various information items by unicast communication. The third method is transmitting information when the electronic apparatus finishes communication with the apparatus being the other party, for example, when an existing communication path is shut off. The fourth method is transmitting information when the state of the electronic apparatus actually changes. The electronic apparatus sends a notice of change of an operation state thereof to the network by multicasting/broadcasting. In addition, the electronic apparatus can also notify a predetermined party of various information items by unicasting, in accordance with the past communication history.

The start signals transmitted by the first transmitting circuit, the second transmitting circuit, and the third transmitting circuit are, for example, a power-on signal which is transmitted from an infrared remote controller of a television, a 5V pull-up signal of an HPD line of HDMI, a Page packet of Bluetooth, or a beacon of Wi-Fi (Registered Trademark), but are not limited to the above and may be a signal pattern which is not standardized. The first transmission circuit, the second transmission circuit, and the third transmission circuit are, for example, an infrared module, an HDMI processing LSI, or a Bluetooth module, but may be a signal processing circuit of an original method, and not limited to the above. No correlation between a signal transmitted between the transmission circuit and the standby circuit, and a signal transmitted between electronic apparatuses through the communication I/F is required.

As illustrated in FIG. 2, although the electronic apparatus A has two standby circuits, that is, the first standby circuits 22a and the second standby circuit 33b, the electronic apparatus A may be configured to wait for a plurality of start signals by one standby circuit. The first standby circuit 301 and the second standby circuit 302 may be realized by the communication I/F 12, which realizes the communication methods a and b, or part of the communication I/F 12. In the same manner, although the electronic apparatus A includes two transmission circuits, that is, the first transmission circuit 17a and the second transmission circuit 17b, the electronic apparatus A may be configured to transmit a plurality of start signals by one transmission circuit. In the same manner, the first transmission circuit 17a and the second transmission circuit 17b may be realized by the communication I/F 12, which realizes the communication methods a and b, or part of the communication I/F 12. The same is applicable to the electronic apparatus B.

The following is explanation of various information items which are exchanged between electronic apparatuses to start the other electronic apparatus. The electronic apparatus A, the electronic apparatus B, and the electronic apparatus C exchange capability information and notification information, by using the communication method a and the communication method b. The capability information includes standby-capability information and transmission-capability information. Since the protocol and data format may be different between the apparatuses dependent on the communication method thereof, the capability information and the notification information may be exchanged in a file of XML format or the like, and the exchange method is not limited to the above. The electronic apparatus A stores capability information and notification information thereof in the nonvolatile memory 11d. The electronic apparatus B and the electronic apparatus C also store information items thereof in their nonvolatile memories 11d.

FIG. 3 is a diagram illustrating an example of standby-capability information. The standby-capability information is information relating to, for example, the first standby circuit 22a and the second standby circuit 22b, in the case of the electronic apparatus A. The standby-capability information includes information relating to at least a communication method used for the standby state, and information relating to the signal, in the standby circuit. The standby-capability information may further include an ID of each standby circuit, the time required for startup of each standby circuit, the standby power consumption and other information (such as character string). The ID is a unique ID assigned to the standby circuit. The time required for startup is the time required for the standby circuit to start stable communication after it receives a start signal. The standby power consumption is power consumed in the standby state of the standby circuit.

FIG. 4 is a diagram illustrating an example of transmission-capability information. The transmission-capability information is information relating to, for example, the first transmission circuit 17a and the second transmission circuit 17b, in the case of the electronic apparatus A. The transmission-capability information includes information relating to at least the communication method used for transmission of a start signal, and information relating to the signal form specifying a start signal, in the transmission circuit. The transmission-capability information may further include other information.

FIG. 5 is a diagram illustrating an example of notification information. The notification information is information relating to, for example, a start signal which the apparatus waits for from another electronic apparatus when the apparatus is in the low-power consumption standby mode. The notification information includes at least one information item (communication method, signal form, ID, and other information) relating to the waited signal. The notification information may further include the time required for startup, the next startup time, the standby power consumption and other information. The next startup time is time when the apparatus independently changes from the low-power consumption standby mode to the normal operation mode or the standby mode, for preset recording of a program.

Figures 6, 7:
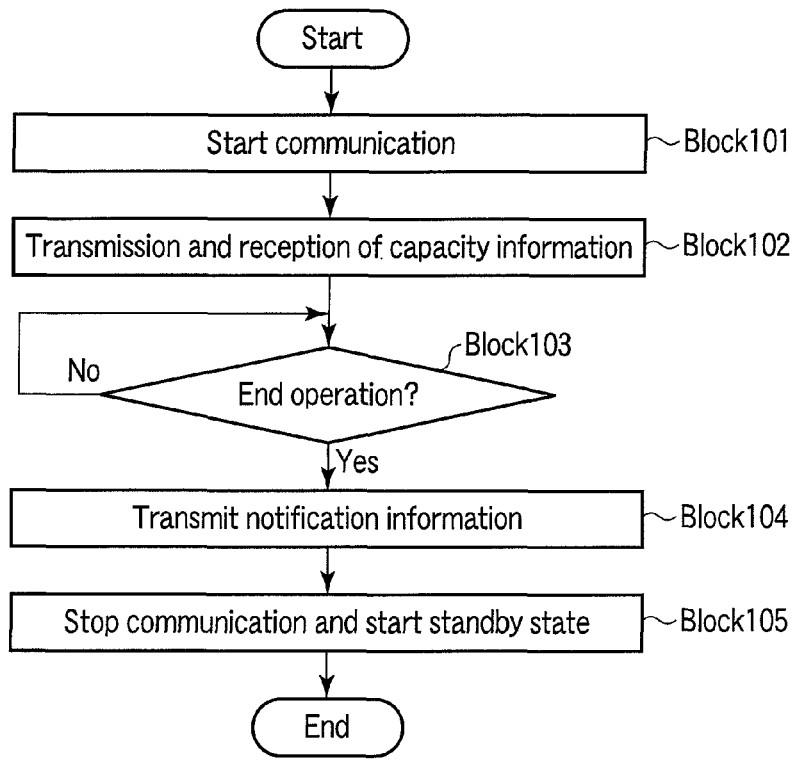
FIG. 6 is an exemplary flowchart illustrating operation performed when a standby state is started according to the first embodiment.
FIG. 7 is an exemplary diagram illustrating a list of start signals for which other apparatuses can wait according to the first embodiment.

Next, exchange of various information items between electronic apparatuses will be explained hereinafter. FIG. 6 is a flowchart illustrating operation performed when a standby state is started in the electronic apparatus. In this example, information exchange between the electronic apparatus A and the electronic apparatus B is explained. The same is applicable to information exchange between the electronic apparatus A and the electronic apparatus C. In the initial state, suppose that both the electronic apparatus A and the electronic apparatus B are in the normal operation mode. First, the electronic apparatus A starts communication with the electronic apparatus B by the communication method a (Block 101). When the communication method a is Bluetooth, the electronic apparatus A transmits a Page packet to the electronic apparatus B to establish ACL connection, and thereafter establishes an L2CAP logic channel.

Next, the electronic apparatus A and the electronic apparatus B transmit and receive the capability information from each other (Block 102). The electronic apparatus A and the electronic apparatus B exchange their standby-capability information items and transmission-capability information items. The electronic apparatus A transmits, to the electronic apparatus B, standby-capability information relating to the first standby circuit 22a and the second standby circuit 22b, and transmission-capability information relating to the first transmission circuit 17a and the second transmission circuit 17b. On the other hand, the electronic apparatus B transmits, to the electronic apparatus A, standby-capability information relating to the first standby circuit 52a, the second standby circuit 52b and the third standby circuit 52c, and transmission-capability information relating to the first transmission circuit 51a, the second transmission circuit 51b and the third transmission circuit 51c. The electronic apparatus A stores the standby-capability information and the transmission-capability information relating to the electronic apparatus B and received from the electronic apparatus B, in the nonvolatile memory 11d. The electronic apparatus B also stores the received information in the same manner. Combinations which can perform standby/startup between the electronic apparatus A and the electronic apparatus B are combinations of the first standby circuit and the first transmission circuit, and combinations of the second standby circuit and the second transmission circuit. Since the third standby circuit and the third transmission circuit are functions which only the electronic apparatus B has, the electronic apparatus B does not use the third standby circuit and the third transmission circuit for standby/startup with the electronic apparatus A.

Next, the electronic apparatus A determines whether the normal operation mode is ended or not, based on operation by the user or independent condition determination processing (Block 103). The independent condition determination processing is, for example, end of operation preset in advance such as preset recording of a program. When the electronic apparatus A does not end the normal operation mode (Block 103, No), the electronic apparatus A continues the normal operation mode. The electronic apparatus B also performs similar operation.

For example, when the electronic apparatus B ends the normal operation mode (Block 103, Yes), the electronic apparatus B transmits notification information to the electronic apparatus A by the communication method a (Block 104). The electronic apparatus B ends the normal operation mode, and changes to the low-power consumption standby mode. The electronic apparatus A stores the notification information relating to the electronic apparatus B in the nonvolatile memory 11d. Thereafter, the electronic apparatus B stops communication with the electronic apparatus A by the communication method a, and starts waiting for a start signal by the first standby circuit 52a, the second standby circuit 52b, and the third standby circuit 52c (Block 105).

The following is an explanation of information which the electronic apparatus A holds based on the standby-capability information, the transmission-capability information, and the notification information received from the electronic apparatus B and the electronic apparatus C. The electronic apparatus B and the electronic apparatus C also hold information in the same manner. The electronic apparatus A holds a list of start signals which the other apparatuses can wait for, and a list of start signals which the other apparatuses can transmit. FIG. 7 is a diagram illustrating a list of start signals which the other apparatuses can wait for. The list of start signals which the other apparatuses can wait for is a list of information relating to start signals which each electronic apparatus that can communicate with the electronic apparatus A can wait for. The start signal list includes at least information relating to the communication method of start signals which can be waited for and information relating to the signals. The electronic apparatus A prepares the list of start signals which the other apparatuses can wait for, based on the standby-capability information and the notification information obtained from the electronic apparatus B and the electronic apparatus C.

The list of start signals which the other apparatuses can transmit is a list of information relating to start signals which each electronic apparatus that can communicate with the electronic apparatus A can transmit. The list of start signals which the other apparatuses can transmit is the same as the list of start signals which the other apparatuses can wait for, as illustrated in FIG. 7. The list which the other apparatuses can transmit includes at least information relating to the communication method of start signals which can be transmitted and information relating to the signals. The electronic apparatus A prepares the list of start signals which the other apparatuses can transmit, based on the transmission-capability information obtained from the electronic apparatus B and the electronic apparatus C.

Figure 8:
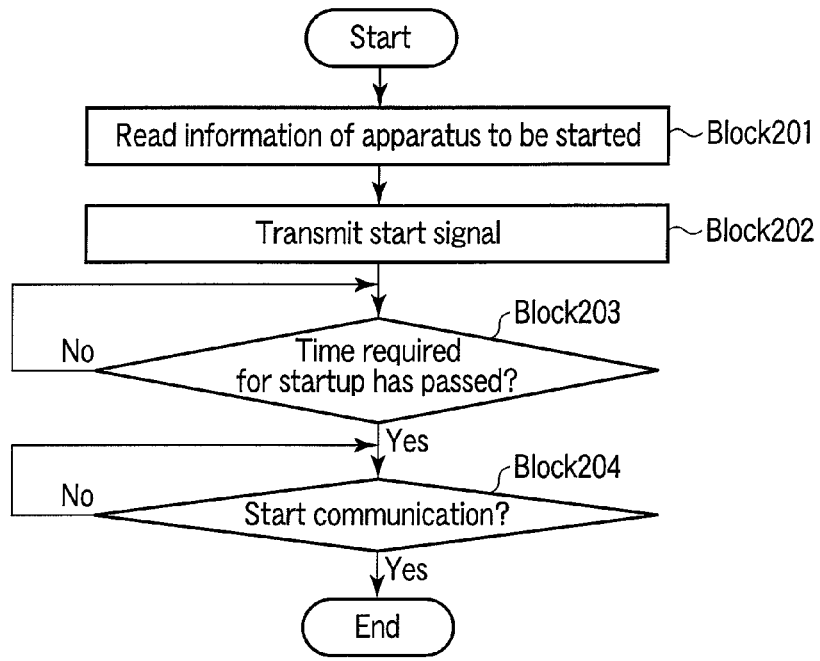
FIG. 8 is an exemplary flowchart illustrating transmission operation of a start signal according to the first embodiment.

FIG. 8 is a flowchart illustrating transmission operation of a start signal. The present embodiment shows a case in which the electronic apparatus A transmits a start signal to the electronic apparatus B. Suppose that the electronic apparatus A is in the normal operation mode, and the electronic apparatus B is in the low-power consumption standby mode. In addition, suppose that the electronic apparatus A and the electronic apparatus B have exchanged their capability information items and notification information items as explained in FIG. 6.

First, the electronic apparatus A reads out information relating to the electronic apparatus to be started, from the nonvolatile memory 11$d$ (Block 201). The electronic apparatus A selects information relating to the electronic apparatus B, from the list of start signals that the other apparatuses can wait for, which is stored in the nonvolatile memory 11$d$. The electronic apparatus A determines start signals which the electronic apparatus B can wait for. The electronic apparatus A compares the list of start signals which the other apparatuses can wait for, with the transmission-capability information of the apparatus A, and determines a start signal to be transmitted to the electronic apparatus B. The electronic apparatus A determines that a start signal can be transmitted to the electronic apparatus B from either of the first transmission circuit 17$a$ and the second transmission circuit 17$b$.

The electronic apparatus A transmits a start signal which the electronic apparatus B waits for, from any one of the first transmission circuit 17$a$ and the second transmission circuit 17$b$ (Block 202). The CPU 11$a$ selects a transmission circuit to transmit a start signal, from the first transmission circuit 17$a$ and the second transmission circuit 17$b$. The electronic apparatus B receives a start signal with at least one of the first standby circuit 51$a$ and the second standby circuit 51$b$, and then changes from the low-power consumption standby mode to the normal operation mode or the standby mode. Therefore, the electronic apparatus B comes to a state which can perform communication with the electronic apparatus A by the communication method a.

Next, after transmitting a start signal to the electronic apparatus B, the electronic apparatus A determines whether the time required for startup of the electronic apparatus B so that the electronic apparatus B to be started comes to a state in which communication can be performed, has passed (Block 203). After the electronic apparatus A transmits a start signal, the electronic apparatus A waits to perform process of starting communication with the electronic apparatus B by the communication method a for the time required for startup, based on information of the time required for startup included in the notification information received from the electronic apparatus B. The electronic apparatus B also waits to perform process of starting communication for the time required for startup. The electronic apparatus A and the electronic apparatus B can efficiently and stably start communication to be started thereafter, by waiting to perform the process of starting communication for the time required for startup. When the time required for startup has not passed (Block 203, No), the electronic apparatus A waits to perform the process of starting communication, until the time required for startup has passed. When the electronic apparatus A does not obtain information relating to the time required for startup of the electronic apparatus B which corresponds to the transmitted start signal, the electronic apparatus A may perform the process of starting communication at desired timing.

When the time required for startup has passed (Block 203, Yes), the electronic apparatus A performs the process of starting communication with the electronic apparatus B by the communication method a (Block 204). When the process of starting communication is not performed (Block 204, No), the electronic apparatus A performs again the process of starting communication with the electronic apparatus B by the communication method a. In the case where the electronic apparatus A fails in the process of starting communication, when there is a start signal which has not been transmitted from either of the first transmission circuit 303 and the second transmission circuit 304 to the electronic apparatus B, the electronic apparatus A may transmit the start signal. When the process of starting communication is performed (Block 204, Yes), the electronic apparatus A starts communication with the electronic apparatus B by the communication method a. Thereafter, the electronic apparatus A and the electronic apparatus B perform the flow illustrated in FIG. 6 again.

In Block 202, it suffices that the electronic apparatus B changes to a mode in which the electronic apparatus B can communicate with the electronic apparatus A by the communication method a, and it does not matter whether the electronic apparatus B changes to the normal operation mode or the standby mode. For example, when the electronic apparatus B is a television broadcasting receiver and displays a picture by turning on the power, the electronic apparatus B changes to the normal operation mode. However, when the television broadcasting receiver displays content stored in the storage device of the receiver on another television broadcasting receiver by DLNA, it is not necessary to turn on the screen of the television broadcasting receiver. Specifically, the state in which the electronic apparatus A can communicate with the electronic apparatus B corresponds to performing page scan, in the case where the communication method a is Bluetooth.

In addition, although the electronic apparatus A transmits a start signal to the electronic apparatus B from one of the first transmission circuit 17$a$ and the second transmission circuit 17$b$, the embodiment is not limited to it. The electronic apparatus A may put priority on the transmission circuit which has the higher probability of succeeding in starting the electronic apparatus B, among the first transmission circuit 17$a$ and the second transmission circuit 17$b$, based on the history of transmitting start signals to the electronic apparatus B. The electronic apparatus A may transmit start signals to the electronic apparatus B by using both the first transmission circuit 17$a$ and the second transmission circuit 17$b$.

As an example of the first embodiment, explained is the case where the electronic apparatus A is the image recording and playback apparatus 1 and the electronic apparatus B is a television broadcasting receiver. Suppose that the electronic apparatus A and the electronic apparatus B are connected by HDMI. When the electronic apparatus B is in the normal operation mode, the electronic apparatus A turns on the power of the electronic apparatus B by an HDMI-CEC command when the user inserts an optical disc 300 into the electronic apparatus A. Then, the electronic apparatus A changes the input of the electronic apparatus B to HDMI, and starts playback of the optical disc 300. On the other hand, when the electronic apparatus B is in the low-power consumption standby mode, the electronic apparatus A transmits a start signal to the electronic apparatus B, and can communicate with the electronic apparatus B by HDMI after the electronic apparatus B changes to the normal operation mode.

According to the first embodiment, it is possible to realize the low-power consumption standby mode for each electronic apparatus without deteriorating the user's convenience, and widely reduce the standby power consumption of the whole system.

Second Embodiment

A second embodiment has a structure in which an electronic apparatus starts another electronic apparatus to communicate with, which cannot be started by the former electronic apparatus, by using another electronic apparatus. In this embodiment, explained is the case where the user wishes to start communication between an electronic apparatus A in the normal operation mode communication and an electronic apparatus C in the low-power consumption mode by a communication method b. The electronic apparatus A compares a list of start signals which the other apparatuses can wait for, with transmission-capability information of the electronic apparatus A, and determines that the electronic apparatus A cannot transmit a start signal to start the electronic apparatus C.

The electronic apparatus A determines that the electronic apparatus B can transmit a start signal to start the electronic apparatus C, based on the list of start signals which the other apparatuses can transmit, which is stored in the nonvolatile memory 11d. The electronic apparatus A issues a command to the electronic apparatus B to transmit a start signal to the electronic apparatus C by using a third transmission circuit 52c. The electronic apparatus A can indirectly change the electronic apparatus C from the low-power consumption standby mode to the normal operation mode or the standby mode. The electronic apparatus B can only transmit a start signal to the electronic apparatus C from the third transmission circuit 52c, and cannot communicate with the electronic apparatus C.

According to the second embodiment, even when the electronic apparatus is not capable of transmitting a start signal to start an electronic apparatus to communicate with, the apparatus can change the electronic apparatus to communicate with to a state in which communication can be performed, by using another electronic apparatus.

Third Embodiment

A third embodiment has a structure in which communication is started between electronic apparatuses by using the next startup time included in notification information. In this example, suppose that an electronic apparatus A is in the low-power consumption standby mode, and an electronic apparatus C is in the normal operation mode.

Even when the electronic apparatus C has information to be transmitted to the electronic apparatus A, the electronic apparatus C compares a list of start signals which the other apparatuses can wait for, with transmission-capability information of the electronic apparatus C, and determines that the electronic apparatus C cannot transmit a start signal to start the electronic apparatus A. In this case, the electronic apparatus C obtains the time when the electronic apparatus A comes to a state in which communication can be performed, based on information of the next startup time included in the notification information received from the electronic apparatus A. The electronic apparatus C can start communication with the electronic apparatus A, at the time when the electronic apparatus A is started. At the next startup time, the electronic apparatus C can transmit, for example, standby-capability information, transmission-capability information, and updated notification information to the electronic apparatus A by the communication method b. Therefore, although the electronic apparatus C is not capable of transmitting a start signal to start the electronic apparatus A, the electronic apparatus C can obtain a communication opportunity by using information of the next startup time of the electronic apparatus A.

According to the third embodiment, regardless of the capability of transmitting a start signal to start another electronic apparatus, it is possible to use information of the next startup time included in communication information of the latter electronic apparatus as timing of updating information shared between electronic apparatuses in the communication system.

Fourth Embodiment

A fourth embodiment has a structure of controlling turning on/off of the standby circuits. For example, an electronic apparatus B compares a list of start signals which the other apparatuses can transmit with standby-capability information of the electronic apparatus B, and stops operation of unnecessary standby circuits thereof.

In this example, communication between the electronic apparatus A and the electronic apparatus B is explained. The electronic apparatus B transmits notification information to the other electronic apparatuses. The notification information is obtained by deleting information relating to a start signal which starts the electronic apparatus B and cannot be transmitted by the other electronic apparatuses in the communication system, from information relating to all the start signals which the electronic apparatus B can wait for. Thereafter, the electronic apparatus B stops power supply to the standby circuit. Specifically, the electronic apparatus B stops operation of the third standby circuit 403. The electronic apparatus B waits for a start signal by one or both of the first standby circuit 401 and the second standby circuit 402. Therefore, the electronic apparatus B transmits notification information including information relating to start signals which the first standby circuit 401 and the second standby circuit 402 can wait for, to the other electronic apparatuses. The electronic apparatus B can further reduce the standby power consumption by limiting the number of operated standby circuits. If the electronic apparatus B obtains transmission-capability information from the electronic apparatus C by, for example, a communication method c, the electronic apparatus B does not stop operation of the third standby circuit 403.

In addition, the electronic apparatus B can select a method having smaller standby power consumption. For example, the electronic apparatus B deletes information relating to a start signal which is waited for by the standby circuit that consumes large standby power, from notification information to be transmitted to the electronic apparatus A. In this case, the electronic apparatus A can stop operation of the transmission circuit to transmit a start signal which is waited for by the standby circuit. Besides, the electronic apparatus B can stop operation of the standby circuit.

In addition, each electronic apparatus in the communication system may start a transmission circuit, which transmits a start signal frequently used in the communication system, and a standby circuit which receives the start signal. Each electronic apparatus in the communication system may stop operation of transmission circuits which transmit the other start signals and standby circuits which receives the other start signals.

According to the fourth embodiment, it is possible to reduce standby power consumption, by stopping operation of a desired number of circuits among standby circuits and transmission circuits of the electronic apparatuses.

Fifth Embodiment

A fifth embodiment has a structure of notifying the user of standby power consumption information in electronic apparatuses which are in the low-power consumption standby mode. In this example, explained is the case where an electronic apparatus A notifies the user of information of standby power consumption of an electronic apparatus B and an electronic apparatus C. Suppose that the electronic apparatus A is in the normal operation mode, and the electronic apparatus B and the electronic apparatus C are in the low-power consumption standby mode.

The electronic apparatus A cannot communicate with the electronic apparatus B and the electronic apparatus C which are in the low-power consumption standby mode. Therefore, the electronic apparatus A cannot obtain the standby power consumption of the electronic apparatus B and the electronic apparatus C at the present time in real time. However, the electronic apparatus A obtains notification information at desired timing from each of the electronic apparatus B and the electronic apparatus C. The electronic apparatus A obtains information of standby power consumption of each of the electronic apparatus B and the electronic apparatus C in the low-power consumption standby mode, based on standby power consumption information included in the notification information. Therefore, the electronic apparatus A can perform control to display the power consumption of the electronic apparatus A, the standby power consumption of each of the electronic apparatus B and the electronic apparatus C on, for example, the monitor 100 connected to the electronic apparatus A.

According to the fifth embodiment, the user can obtain information of standby power consumption of electronic apparatuses in the low-power consumption standby mode, without starting the electronic apparatuses, from another electronic apparatus.

Sixth Embodiment

A sixth embodiment has a structure of starting electronic apparatuses which do not have capacities of mutually starting them, without using another electronic apparatus. As illustrated in FIG. 2, the electronic apparatus A and the electronic apparatus C do not have capacities of mutually starting them. Therefore, when the user performs operation, which requires cooperation with the electronic apparatus C by the communication method b, by using the electronic apparatus A, the electronic apparatus A performs control to display a message "Turn on the power of the electronic apparatus C" on, for example, the monitor 100 connected to the electronic apparatus A.

In addition, since the electronic apparatus C cannot communicate with the electronic apparatus B, the electronic apparatus C does not have any direct/indirect devices to start the electronic apparatus A. Therefore, the electronic apparatus C cannot start the electronic apparatus A through the electronic apparatus B being another electronic apparatus, as explained in the second embodiment. In this case, it suffices that the electronic apparatus A is operated at the time when the electronic apparatus C is operated. First, the electronic apparatus C obtains the time of performing operation which is preset in the electronic apparatus C and requires cooperation with the electronic apparatus A. Next, the electronic apparatus C issues a command in advance to the electronic apparatus A to set the next startup time, such that the electronic apparatus A is operated at the time of performing the operation. The electronic apparatus A sets the timer 24 so that the electronic apparatus A changes from the low-power consumption standby mode to the normal operation mode at the next startup time, based on the command from the electronic apparatus. The electronic apparatus A may perform control to display a message "Please set the next startup time to prevent the apparatus from being in the low-power consumption standby mode at the operation time" on the monitor 100, based on the command received from the electronic apparatus C.

According to the sixth embodiment, the electronic apparatus can communicate with another electronic apparatus, which the electronic apparatus does not has any device for directly/indirectly starting, at proper timing, by using information relating to the next startup time.

Seventh Embodiment

A seventh embodiment has a structure in which a started electronic apparatus changes to the low-power consumption standby mode again. In this embodiment, explained is the case where an electronic apparatus A does not start communication with an electronic apparatus B by the communication method a even after the time required for startup has passed, since the electronic apparatus A transmits a start signal to the electronic apparatus B in Block 204 of FIG. 8.

The electronic apparatus B changes to the low-power consumption standby mode again, when communication with the electronic apparatus A by the communication method a is not started after a predetermined standby time has passed since a start signal is received from the electronic apparatus A. The standby time is, for example, time corresponding to the time required for startup. When the communication method is Bluetooth, the standby time is 5 seconds as illustrated in FIG. 5. The standby time may be counted from the time when the electronic apparatus A changes to the normal operation mode.

The standby time may be included in the standby-capability information or the notification information. In addition, when the time required for the electronic apparatus A to prepare for communication by the communication method a is longer than the standby time, the electronic apparatus A may request the electronic apparatus B to extend the standby time. Extension of the standby time may be requested at desired timing, for example, at any time before a predetermined time has passed since transmission of a start signal.

According to the seventh embodiment, the electronic apparatus changes to the low-power consumption standby mode again after the standby time has passed since a start signal is received, it is possible to reduce wasted power consumption due to starting of the electronic apparatus by erroneous transmission/reception of a start signal.

Eighth Embodiment

Figure 9:
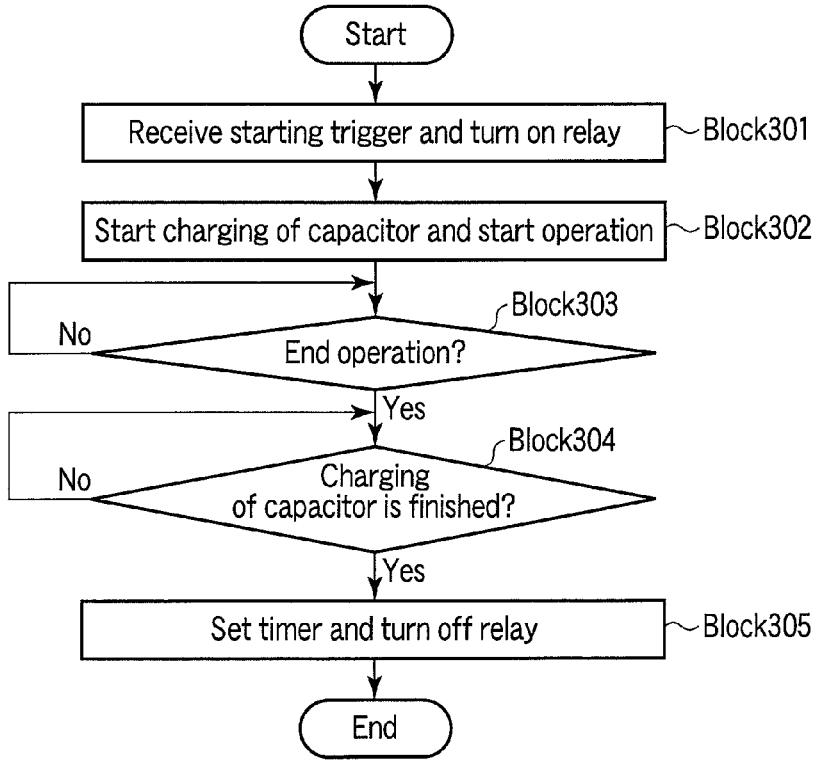
FIG. 9 is an exemplary flowchart for illustrating charging of a power source by a starting trigger according to an eighth embodiment.

An eighth embodiment has a structure in which a power source 21 provided on a low-power consumption circuit module 20 is charged at proper timing. FIG. 9 is a flowchart for explaining charging of the power source 21 by a starting trigger. The starting trigger indicates turning on the power switch, passage of the timer-finishing time, or reception of a start signal from another electronic apparatus. When an image recording and playback apparatus 1 receives a starting trigger, the image recording and playback apparatus 1 switches a relay circuit 15 to start power supply (Block 301). In this processing, the image recording and playback apparatus 1 changes from the low-power consumption standby mode to the normal operation mode. In addition, the power source 21 is supplied with electric power through an AC/DC converter 16 (Block 302).

Next, a CPU 11a determines whether a command to finish operation is received by turning off the power switch by the user's operation of a remote controller 400, or a command from another electronic apparatus (Block 303). When the CPU 11a does not receive a command to finish operation (Block 303, No), the CPU 11a continues to monitor whether a command to finish operation is received or not.

When the CPU 11a receives a command to finish operation (Block 303, Yes), the CPU 11a determines whether charging of the power source 21 is finished or not (Block 304). In this processing, the image recording and playback apparatus 1 changes from the normal operation mode to the standby mode. The CPU 11a determines that charging is finished when, for example, the power source 21 is charged 95% or more. When the CPU 11a determines that charging of the power source 21 is not finished (Block 304, No), the CPU 11a continues to monitor whether charging of the power source 21 is finished or not. When the CPU 11a determines that charging of the power source 21 is finished (Block 304, Yes), the CPU 11a sets the timer-finishing time of the timer 24, and switches the relay circuit 15 to stop power supply (Block 305). In this processing, the image recording and playback apparatus 1 changes from the standby mode to the lower-power consumption standby mode. The image recording and playback apparatus 1 maintains the low-power consumption standby mode until it receives a starting trigger.

The CPU 11a sets the timer-finishing time, for example, as follows. As an example, the timer-finishing time is time based on the time for which the low-power consumption circuit module 20 can continuously waits for a starting trigger by power supply from the power source 21. As another example, the timer-finishing time is the time when EPG data is to be received, the time of starting recording which is preset by the user, and the time when communication with another electronic apparatus is to be started.

FIG. 10 is a flowchart for illustrating charging of the power source 21 at the timer-finishing time. When the timer 24 determines that the timer-finishing time has come, a radio processor 23 switches the relay circuit 15 such that electric power is supplied to the image recording and playback apparatus 1 through the relay circuit 15 (Block 401). In this processing, the image recording and playback apparatus 1 changes from the low-power consumption standby mode to the normal operation mode or the standby mode. The power source 21 is supplied with electric power through the AC/DC converter 16.

Next, the image recording and playback apparatus 1 performs processing which is set to be performed at the timer-finishing time (Block 402). As an example, the CPU 11a downloads EPG data through a terrestrial digital broadcasting tuner 106. As another example, the CPU 11a communicates with another electronic apparatus through a communication I/F 12. The CPU 11a determines whether the processing is finished or not (Block 403). When the CPU 11a determines that the processing is not finished (Block 403, No), the CPU 11a continues to monitor whether the processing is finished or not. When the CPU 11a determines that the processing is finished (Block 403, Yes), the CPU 11a performs processing similar to Block 304 (Block 404), and then processing similar to Block 305 (Block 405).

According to the eighth embodiment, it is possible to charge the power source 21 at timing which does not deteriorate the user's convenience. In addition, since the image recording and playback apparatus changes to the low-power consumption mode after charging of the power source 21 is finished, the power consumption can be reduced.

The various modules of the systems described herein can be implemented as software applications, hardware and/or software modules, or components on one or more computer, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system in which a first electronic apparatus communicates with a second electronic apparatus, the first electronic apparatus comprising
    a receiver configured to receive, from the second electronic apparatus, a command signal which instructs change of a power control state,
    a first transmitter configured to transmit, to the second electronic apparatus, standby-capability information which includes a communication method adopted by the receiver and a signal form specifying the command signal, and
    a change module configured to change the power control state when the receiver receives the command signal, and
the second electronic apparatus comprising
    a second transmitter configured to transmit the command signal which instructs the first electronic apparatus to change the power control state,
    a third transmitter configured to transmit, to the first electronic apparatus, transmission-capability information which includes a communication method adopted by the second transmitter and a signal form specifying the command signal, and
    a selection module configured to select to transmit the command signal included in the transmission-capability information, when communicating with the first electronic apparatus through the third transmitter.

2. The apparatus of claim 1, wherein the change module is configured to render the operation state ineffective, except for at least one of the standby receivers, based on intensity of standby power consumption.

3. The apparatus of claim 1, wherein the change module is configured to render the operation state ineffective, except for at least one of the standby receivers, based on stability of reception of the command signal.

4. An electronic apparatus comprising:
    a first receiver configured to receive, from another electronic apparatus, a command signal which instructs change of a power control state;
    a second receiver configured to receive transmission-capability information relating to the command signal which the another electronic apparatus is able to transmit
    a transmitter configured to transmit, to the another electronic apparatus, standby-capability information which includes a communication method adopted by the first receiver and a signal form specifying the command signal;

a determination module configured to determine a receiver to be used as a standby receiver waiting for the command signal, from the first receiver, based on the transmission-capability information and the standby-capability information of the electronic apparatus; and a change module configured to change the power control state when the first receiver receives the command signal, wherein the transmitter is configured to transmit standby-capability information relating to the standby receiver, and wherein the change module is configured to render the operation state of the standby receiver effective among the first receiver.

5. The apparatus of claim 4, wherein the change module is configured to change the power control state from a state of performing first power consumption to a state of performing second power consumption which is larger than the first power consumption, when the command signal is received.

6. The apparatus of claim 4, wherein
the change module is configured to change the operation state of the transmitter from an ineffective state to an effective state, when the command signal is received.

7. The apparatus of claim 6,
wherein the second receiver is configured to receive from the another electronic apparatus, notification information which includes waiting time of the command signal, and wherein the change module is configured to change the operation state of the transmitter from an effective state to an ineffective state, when the transmitter waits for starting communication with the another electronic apparatus, though the waiting time passes since the command signal is received.

8. The apparatus of claim 6, wherein the transmitter is configured to start communication with the another electronic apparatus based on time required for startup for the electronic apparatus, after the time required for startup passes since the command signal is received.

9. The apparatus of claim 6, wherein the transmitter is configured to transmit, to the another electronic apparatus, notification information, which includes next startup time at which the operation state of the transmitter in the electronic apparatus becomes effective.

10. An electronic apparatus comprising:
a first transmitter configured to transmit a command signal which instructs another electronic apparatus to change a power control state;

a second transmitter configured to transmit, to the another electronic apparatus, transmission-capability information which includes a communication method adopted by the first transmitter and a signal form specifying the command signal;

a receiver configured to receive standby-capability information relating to the command signal which the another electronic apparatus is able to receive; and a selection module configured to select to transmit the command signal included in the transmission-capability information, when communicating with the another electronic apparatus through the second transmitter, wherein the selection module is configured to select the command signal among the first transmitter, based on the standby-capability information received by the receiver, and the transmission-capability information of the electronic apparatus.

11. The apparatus of claim 10, wherein the second transmitter is configured to start communication with the another electronic apparatus based on time required for startup received from the another electronic apparatus, after the time required for startup passes since the command signal is transmitted.

* * * * *